T. A. McALLISTER.
PROCESS OF VULCANIZING.
APPLICATION FILED DEC. 10, 1919.

1,340,965.  Patented May 25, 1920.

WITNESSES
E. A. Buchanan.
C. E. Traynor.

INVENTOR
T. A. McAllister,
BY
ATTORNEYS

UNITED STATES PATENT OFFICE.

THOMAS ALEXANDER McALLISTER, OF AUGUSTA, GEORGIA.

PROCESS OF VULCANIZING.

1,340,965.  Specification of Letters Patent.  Patented May 25, 1920.

Application filed December 10, 1919. Serial No. 343,831.

*To all whom it may concern:*

Be it known that I, THOMAS ALEXANDER MCALLISTER, a citizen of the United States, and a resident of Augusta, in the county of Richmond and State of Georgia, have invented certain new and useful Improvements in Processes of Vulcanizing, of which the following is a specification.

My invention is an improvement in processes of vulcanizing, as for instance in the repair of pneumatic tubes and the like, wherein it is impracticable or undesirable to place a backing of vulcanized rubber on the reverse of the tube or sheet to be repaired.

In the usual method of repairing a pneumatic tube, a backing of vulcanized rubber is placed on the reverse or inside of the tube or sheet to be repaired, the opening is filled with raw rubber and cement, such rubber and cement being supported by the sheet and heat and pressure is then applied to vulcanize.

This method is often impracticable, or at least undesirable because of the difficulty or impossibility of placing the sheet of vulcanized rubber on the reverse side of the article being repaired.

Figure 1:
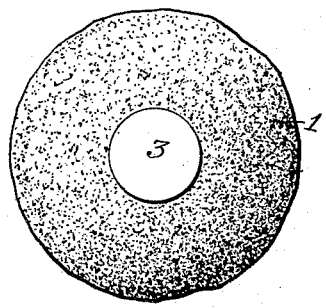
Figure 1 is a top plan view showing the initial step in the process.
Figure 2:
Fig. 2 is a vertical section.
Figure 3:
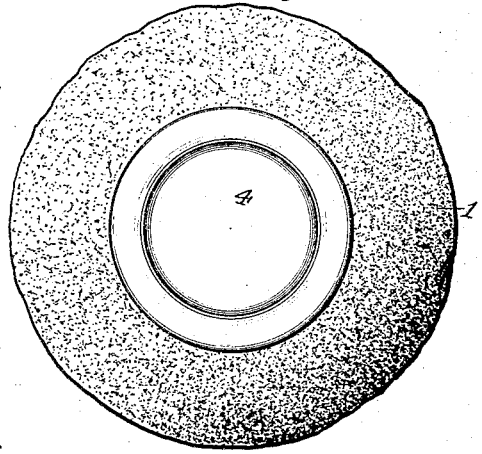
Fig. 3 is a plan view showing the process completed.
Figure 4:
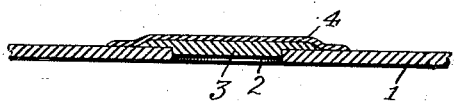
Fig. 4 is a transverse section of Fig. 3.

In my improved process, I place a thin sheet of vulcanized rubber, of a size to cover the said opening and to overlap the article at the edges of the opening, some little distance, as clearly shown in Fig. 2, wherein the article to be repaired is indicated at 1, the opening at 2, and the sheet of vulcanized rubber at 3.

The edges of this sheet 3 are cemented to the article to be repaired, with a vulcanizing cement, and the raw rubber indicated at 4 is applied on the outer face of the sheet 3 of vulcanized rubber, overlying the said sheet. This layer of raw rubber is made of sufficient thickness to match the thickness of the article being repaired.

Now with the sheet and the raw rubber in place, the rubber is vulcanized by heat and pressure in the usual manner. The sheet 3 and the raw rubber 4, are pressed into the opening 2, while the said sheets are made practically integral with the article by the process of vulcanization. The sheet of vulcanized rubber serves as a container for holding the raw rubber and for preventing it passing through the opening, while at the same time it prevents adhesion between that portion of the tube being repaired and the opposite side. In order to attain an even flow of rubber in the action of vulcanization a vulcanized rubber pad is used on the reverse side of the folded tube and heat and pressure are applied to the patch of raw rubber.

I claim:

1. A process of repairing pneumatic tubes and the like, which consists in placing over the opening to be closed a sheet of vulcanized rubber, and in cementing the edges of the sheet to the tire about the opening, and in placing raw rubber over the sheet and in vulcanizing said rubber by heat and pressure.

2. A process of repairing breaks in pneumatic tubes and the like, which consists in cementing to the outer face of the tire a sheet of vulcanized rubber, in placing raw rubber on the outer face of the sheet and in vulcanizing said rubber.

THOMAS ALEXANDER McALLISTER.